91-491 AJ 343 E7
6/30/87 OR RE 32,446

United States Patent [19] [11] E Patent Number: Re. 32,446
Allart et al. [45] Reissued Date of Patent: Jun. 30, 1987

[54] PRESSURIZED FLUID ENGINE EQUIPPED WITH MEANS FOR SELECTING ITS SPEED OF ROTATION

[75] Inventors: Bernard R. Allart; Jean-Claude Lallier, both of Crepy-en-Valois; Alain W. Noël, Verberie, all of France

[73] Assignee: Poclain Hydraulics, Verberie, France

[21] Appl. No.: 777,719

[22] Filed: Sep. 19, 1985

Related U.S. Patent Documents

Reissue of:
[64] Patent No.: 4,404,896
Issued: Sep. 20, 1983
Appl. No.: 252,152
Filed: Apr. 8, 1981

[30] Foreign Application Priority Data

Apr. 30, 1980 [FR] France ..... 8009854

[51] Int. Cl.[4] ..... F01B 13/06
[52] U.S. Cl. ..... 91/491; 91/497
[58] Field of Search ..... 91/491, 492, 497

[56] References Cited

U.S. PATENT DOCUMENTS 3,369,457 2/1968 Guinot ..... 91/491
3,403,599 10/1968 Guinot ..... 91/491
3,863,447 2/1975 Foster ..... 60/425
3,902,566 9/1975 Bird ..... 91/6.5
4,326,450 4/1982 Bacquie ..... 91/491
4,398,450 8/1983 Louhio ..... 91/497

*Primary Examiner*—Carlton R. Croyle
*Assistant Examiner*—Paul F. Neils
*Attorney, Agent, or Firm*—Mason, Fenwick & Lawrence

[57] ABSTRACT

The invention relates to a fluid engine constituted by cylinders divided into two groups, by a valve bank which comprises two enclosures connected selectively to a source of fluid and to a reservoir, and connecting each cylinder of a first group, with the said enclosures, successively, and by means for selecting the speed of the engine, which means comprise a movable member adapted to occupy two positions which, in a first position, creates a communication between the cylinder of the second group and the enclosures, successively, and in a second position, isolate said cylinders from one of the enclosures.

Said engine comprises a shuttle valve which, when the movable member is in its second position, connects the cylinders of the second group to that of the two enclosures which contains the fluid under the lowest pressure.

The invention finds an application in the production of a mechanically reliable reversible engine.

8 Claims, 9 Drawing Figures

PRESSURIZED FLUID ENGINE EQUIPPED WITH MEANS FOR SELECTING ITS SPEED OF ROTATION

Matter enclosed in heavy brackets [ ] appears in the original patent but forms no part of this reissue specification; matter printed in italics indicates the additions made by reissue.

The present invention relates to pressurized fluid engines equipped with means for selecting their speed of rotation.

Many applications of such engines use a pressurized hydraulic fluid. In order to describe both the prior art and the invention, hydraulic engines will be particularly referred to hereinafter, but it is to be understood that the scope of the invention is not limited to the sole field of hydraulic engines, but on the contrary covers, in general, all engines using pressurized fluid.

Motors which comprise selector means for selecting their speed of rotation are known, in particular from French Pat. Nos. 1 411 047, 1 563 866 and 2 127 268. The modes of selection can vary.

For example, the motor described in French Pat. No. 1 411 047 comprises a plurality of cylinders divided into two groups at least. When in operation, the cylinders of the first group are individually connected alternatively to two main enclosures, one connected to a source of pressurized fluid, the other to a relief reservoir, whereas the cylinders of the second group are selectively, either connected to, and this in alternate manner, or permanently isolated from one of the said two main enclosures.

In the engine described in French Pat. No. 1 563 866, it is no longer the cylinders but the cams of the engine which are divided into at least two groups. When in operation, the cylinders situated opposite the cams of a first one of these groups are individually connected alternately to two main enclosures, one of which is connected to a source of pressurized fluid, and the other to a relief reservoir, whereas the cylinders situated opposite the cams of the second group of cams are selectively, either connected to, and this in alternate manner, or permanently isolated from one of the two main enclosures.

As to French Pat. No. 2 127 268, this is cited to recall that certain engines exist in which the speed of rotation can be selected not only as in the engines described in the first two of the cited patents, by adding up the cubic capacities to be supplied, but also by subtracting these cubic capacities. In the engine of this last patent, the cylinders corresponding, either to one of the groups of cylinders, or to one of the groups of cams are selectively permanently isolated from one of the main enclosures.

In the engines which belong to those three known types of engines, certain cylinders, when in operation, are permanently isolated from one of the main enclosures and connected to the other. Now, a large number of pressurized fluid engines are also reversible. In other words, each one of the said two main enclosures is connected either to a source of pressurized fluid, or to a relief reservoir, the second enclosure being naturally correspondingly connected to the said reservoir or to the said source of fluid. In such a known reversible engine, the cylinders which, in the special operation considered, are permanently isolated from one of the enclosures, are also connected to the other enclosure. In this particular mode of operation, the said cylinders have no driving force, but they are nonetheless permanently connected, for one of the possible directions of rotation, to the highly pressurized fluid. This is of course a serious disadvantage as the mechanical stresses which act on the movable elements corresponding to those cylinders (such as for example, cylinders, pistons, runners, cams) causes the premature wear thereof, which is expensive and can be at the origin of breakdowns.

It is the object of the present invention to overcome these disadvantages by proposing for these types of engines, a special design wherein, during the operation when certain cylinders are permanently isolated from one of the main enclosures and connected to the other main enclosure, said cylinders are connected with that of the two enclosures which contains the fluid under the lowest pressure.

The invention therefore relates to a pressurized fluid engine comprising:

a plurality of cylinders divided into at least two groups, a fluid control valve with two enclosures connected selectively to a source of pressurized fluid and to a relief reservoir and connecting each cylinder of at least a first of said two groups of cylinders with the said enclosures, successively, and, means for selecting the speed of rotation of the engine which comprises a movable member adapted to occupy selectively at least two positions, and which according to such selection, in a first position, creates a communication between the cylinders of the second group of said two groups of cylinders, and the two enclosures, successively, and in a second position, isolates said cylinders of said second group of cylinders from at least one of the said enclosures.

Said engine comprises a shuttle valve which, when the said movable member is placed in its second position, connects the cylinders of the second group of cylinders to that of said two enclosures which contains the fluid under the lowest pressure.

The following arrangements are also advantageously adopted:

the shuttle valve is constituted by a bore provided in the movable member and closed at both ends, and by a slide valve mounted in the said bore, sliding tightly inside the said bore between two outermost positions and defining with said bore two end chambers which, in the said second position of the said movable member, are permanently connected via two separate first conduits provided in the movable member, one, by one of the said first conduits to one of the two enclosures, the other, via the other first conduit to the other enclosure, said slide valve comprising two second inner conduits connecting on the axial periphery of the slide valve, one of said second conduits to one of the said chambers and the other second conduit to the other chamber, whereas two third conduits are provided in the said movable member and connect the cylinders of the second group of cylinders to the said bore and, in the second position of the movable member issue:

for one of the said third conduits, into one of the second conduits, when the fluid, under the highest of the pressures prevailing in the two enclosures, is contained in the chamber opposite that to which is connected the said second conduit, for the other third conduit, into the other second conduit, when the fluid, under the highest of the pressures prevailing in the two enclosures, is contained in the other of the said two chambers;

the slide valve has a vertical plane of symmetry with respect to which the second conduits are placed symmetrically;

one of the ends of the bore is constituted by a removable plug permitting to introduce the slide valve inside the said bore and to hold it there.

It should at this stage be noted that the arrangements according to the invention are particularly applicable to the three types of engines defined in the three patents cited hereinabove.

The invention will be more readily understood on reading the following description with reference to the accompanying drawings in which.

The engine illustrated is constituted by.

Figure 5:
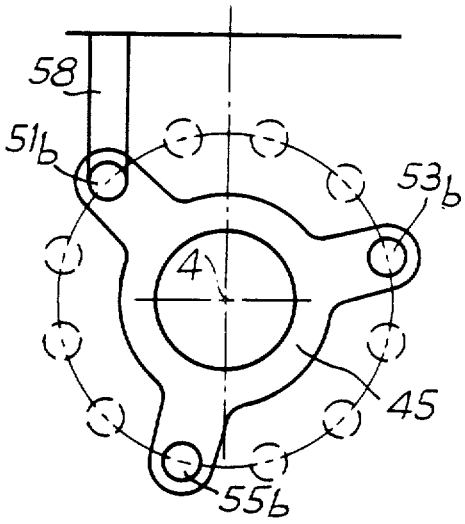
Figure 5:
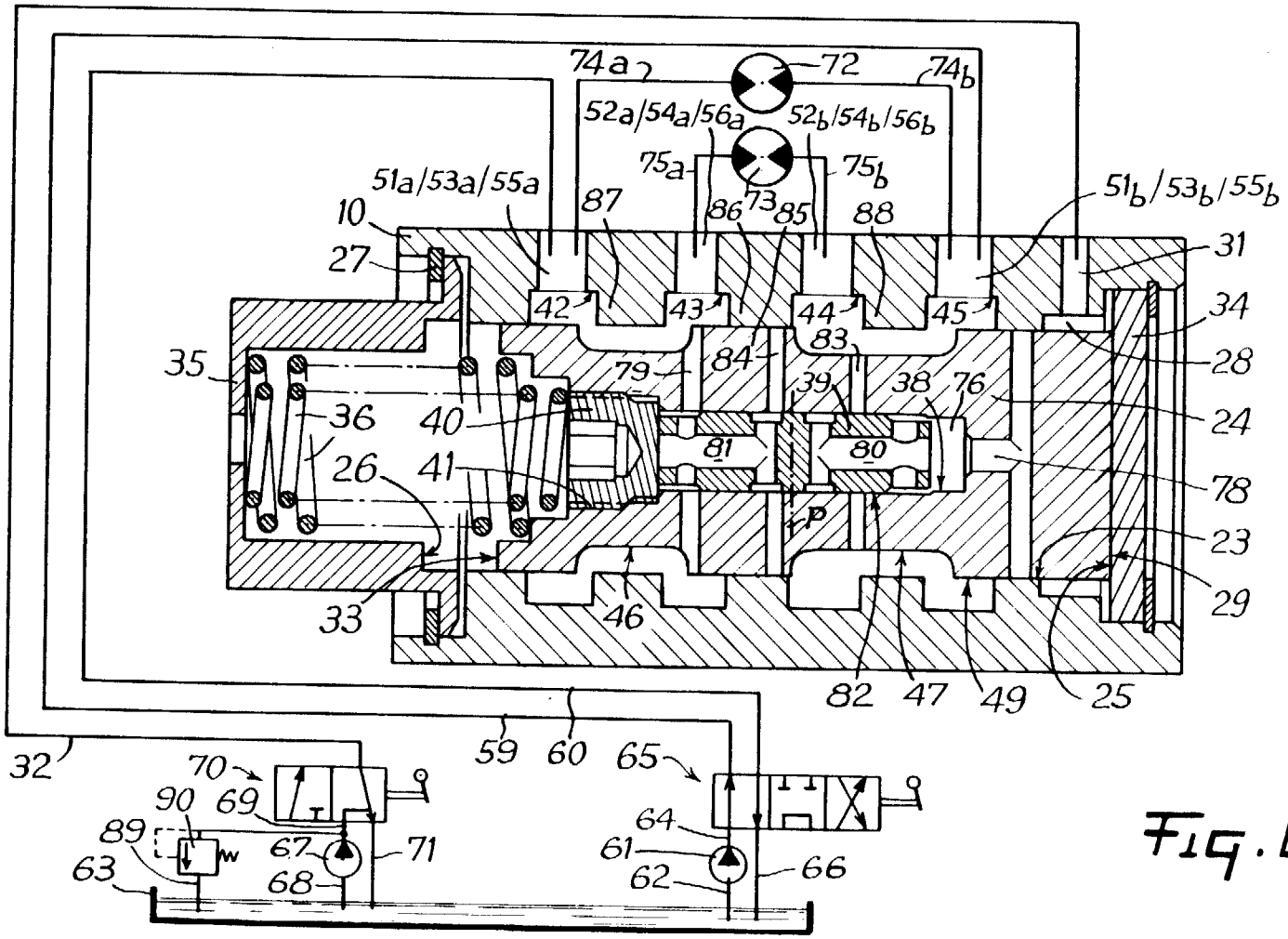

a casing 1, defining a closed enclosure 2, a rotor 3, mounted for rotation with respect to the casing 1, about a geometrical axis 4, via ball bearings 5 and roller bearings with tapered rollers 6, a cylinder-block 7, mounted co-axially to the axis 4 and made fast in rotation with the rotor 3 via grooves 8 provided in those two parts, a valve-seat 9, which is plane and interposed between the cylinder-block 7 and a valve-bank 10 forming part of the casing 1 through being secured with screws 11 on the radial shell 12 of the said casing, the plane face 13 of which valve-seat is resting on a plane face 14 belonging to the cylinder block 7, placed opposite, and which is made fast in rotation with the valve bank 10 by means of studs 15 introduced in holes 16 of the said valve bank and cooperating with grooves 17 provided in the said valve-seat 9, a plurality of cylinders 18 provided in the cylinder block 7, arranged radially with respect to the axis 4, and inside each one of which is slidably mounted a piston 19, a double cam 20, which constitutes the inside face of the radial shell 12, and which comprises a plurality of undulations forming an alternate succession of troughs and crests similar to the structure illustrated for example in FIG. 5 of French Pat. No. 2 127 268, cited hereinabove, a plurality of girders 21, one for each piston, each end of each one of which supports a rotary wheel 22, resting on one of the tracks of the cam 20, whereas the corresponding piston 19 pushes the said girder 21 towards the said cam.

The valve bank 10 comprises a bore 23 inside which a piston valve 24 is mounted for tight sliding between two abutments 25, 26 constituted by the transverse faces of two movable members 34, 35, normally held in position on the valve bank 10 by elastic rings or circlips 27. A pressurized fluid admission chamber 28 is provided at one end of the bore 23, inside which chamber is situated one, 29, of the ends of the slide-valve 24. A conduit 31, provided in the valve bank 10, connects the said chamber 28 to an outside conduit 32. Moreover, between the other end 33 of the slide-valve 24 and the corresponding movable part 35, is interposed a helical spring 36, the effect of which is to oppose that of any pressurized fluid contained in the chamber 28 and tends to place the slide-valve 24 in a first position which is illustrated in the configurations shown in FIGS. 6 and 7, the said slide-valve being on the contrary placed in a second position, shown in FIGS. 8 and 9, when the effect of the fluid pressure is predominant. Whereas the movable part 34, which delimits the chamber 28 is adjusted rightly on the valve bank 10, the other movable part 35 comprises a hole 37 allowing the fluid to flow freely towards or out of the chamber 30 delimited by the said movable part 35 and the valve bank 10.

Inside the slide valve 24 which is, as will be seen hereinafter, a valve for selecting the speed of rotation of the rotor 3, there is provided another bore 38, inside which a shuttle valve 39 is slidably mounted. Said bore 38, which is a blind bore, once the shuttle valve has been introduced therein, has its end wherein the said shuttle valve is introduced, closed off by a plug 40 screwed (41) in the selection valve 24.

The special characteristics of the selection valve 24 and of the shuttle valve 39 will be described hereinafter with reference to FIGS. 6 to 9. It can nonetheless be indicated at this stage that the valve bank 10 comprises four annular bore grooves 42, 43, 44 and 45 issuing into the bore 23 and communicating with one another by means of two annular spool grooves 46 and 47 provided in the selection valve 24 and issuing on the cylindrical periphery 49 of the said selection valve. A detail of how these communications are created will also be given hereinafter.

It should be remarked that the valve bank 10, as is in fact known with other engines, comprises a plurality of holes, 12 in this case, of two types a and b, one type-a hole succeeding to one type-b hole, said holes communicating with the different grooves 42, 43, 44 and 45 and issuing into as many holes 48 provided in the valve-seat 9. These are successive holes 51a, 51b, 52a, 52b, 53a, 53b, 54a, 54b, 55a, 55b, 56a, 56b which communicate:

the holes 51a, 53a and 55a with the groove 42, the holes 51b, 53b and 55b with the groove 45, the holees 52a, 54a and 56a with the groove 43, the holes 52b, 54b, and 56b with the groove 44.

In order to simplify the representation, the details of the selection valves 24 and of the shuttle valve 39 have not been shown in the cross-section of FIGS. 2 to 5.

Each cylinder 18 communicates with the plane face 14 of the cylinder-block 7 via a conduit 50 the opening 50a of which superimposes alternately upon the openings of the twelve holes 48 provided in the valve-seat 9. It should also be noted that the grooves 42 and 45 provided in the valve bank 10 are joined, via two inner conduits 57 and 58 to two external main supply conduits 59 and 60, respectively.

Figure 1:
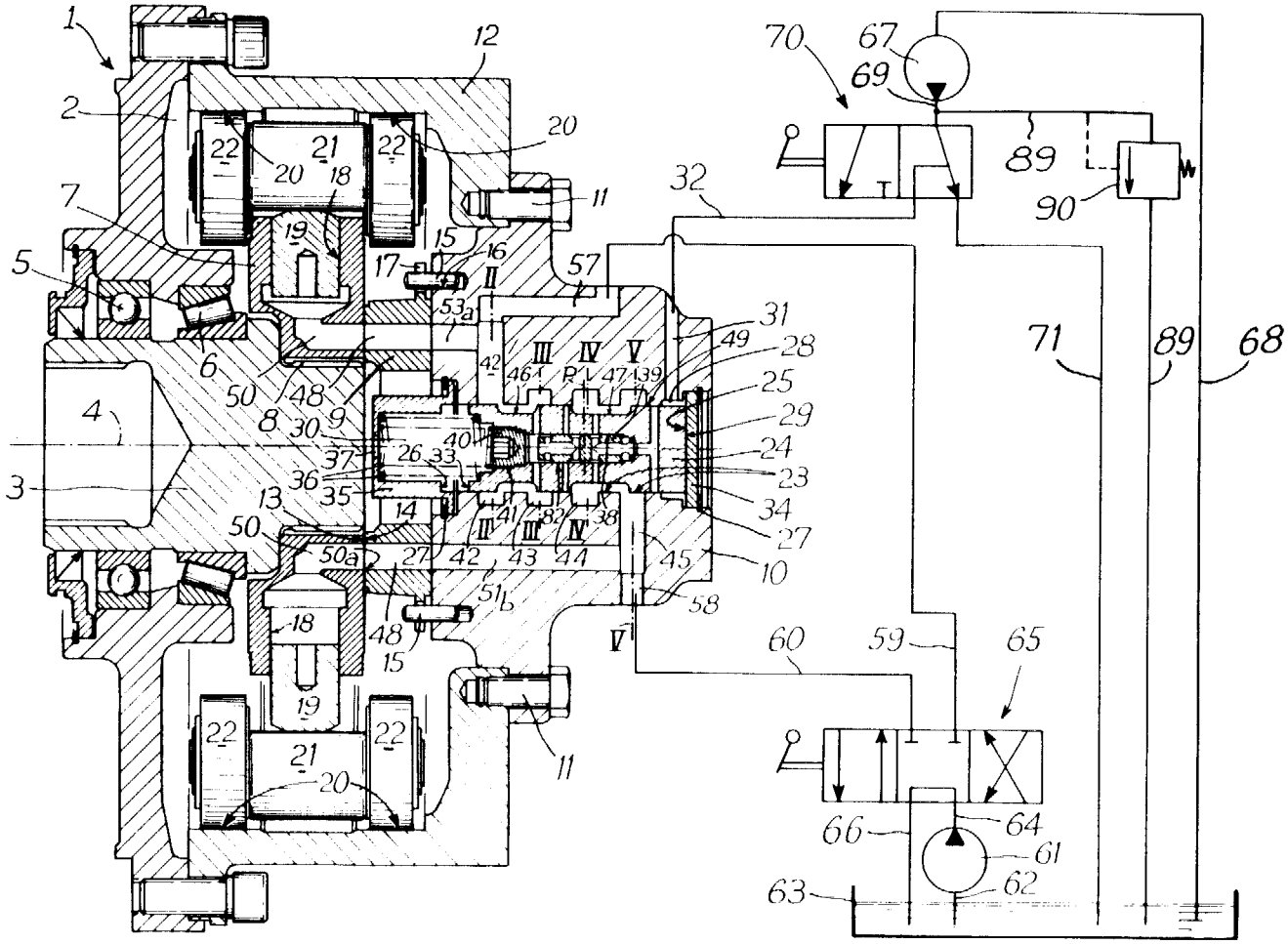
FIG. 1 is an axial cross-section of an engine according to the invention, along I—I of FIG. 2.
Figure 2:
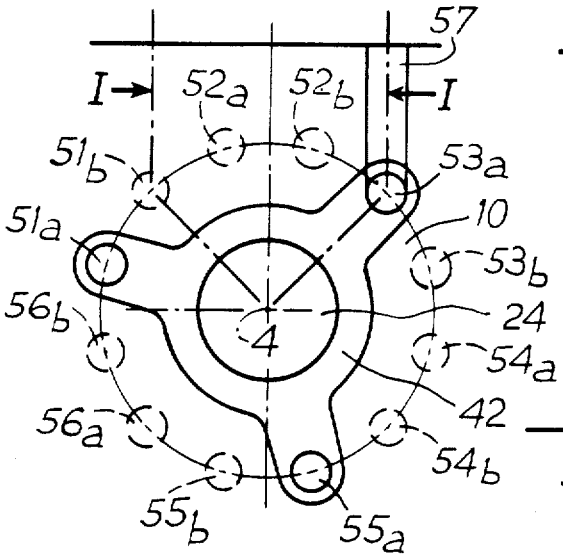
FIGS. 2, 3, 4 and 5 are partial cross-sections along II—II, III—III, IV—IV and V—V, respectively, of FIG. 1; and, FIGS. 6, 7, 8 and 9 are partial views of the engine of FIG. 1, with diagrammatical cross-sections of its control mechanism, corresponding to four different configurations of operation.
Figure 3:
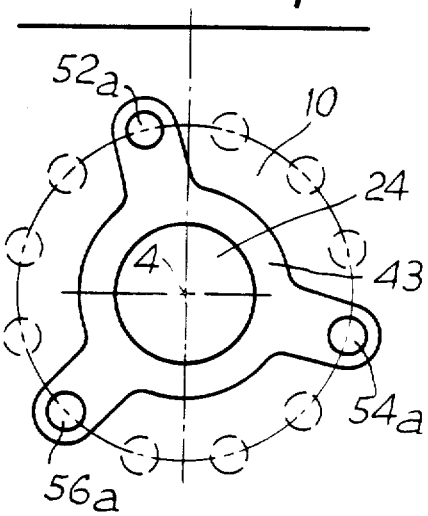
Figure 4:
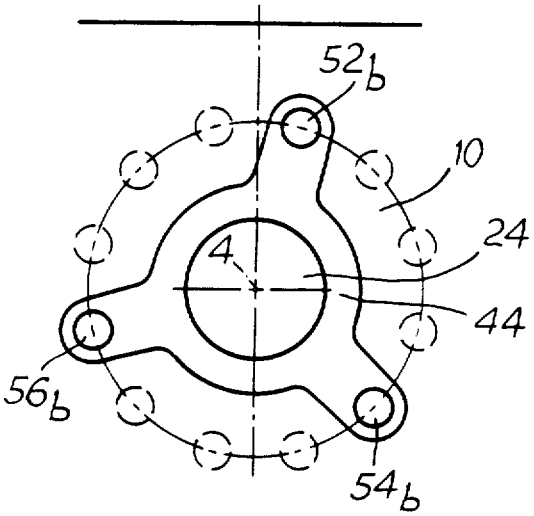

Finally, it is noted with reference to FIG. 1 that a main pump 61 is connected via its induction pipe 62 with a fluid reservoir 63, and via its delivery pipe 64, with a three-position control valve 65. To the said control valve 65 are connected the conduits 59 and 60, as well as a conduit 66, which is also connected to the reservoir 63. Another pump 67 is connected via its induction pipe 68 to the reservoir 63 and via its delivery pipe 69 to a two-position control valve 70. A conduit 89 connects the conduit 69 to the reservoir 63, a calibrated relief valve 90 being placed on said conduit 89 and allowing any excess fluid delivered by the pump 67 to return to the reservoir 63. To the said control valve 70 are connected the conduit 32 and a conduit 71, which is also connected to the reservoir 63.

The three positions of the control valve 65 correspond:

the first position to creating a communication between the conduits 64 and 59 and between the conduits 60 and 66;

the second position, to creating a communication between the conduits 64 and 66, and to closing off the conduits 59 and 60; and, the third position, to creating a communication between the conduits 64 and 60 and between the conduits 59 and 66.

The two positions of the control valve 70 correspond:

the first position, to creating a communication between the conduits 32, 69 and 71; and, the second position, to creating a communication between the conduits 69 and 32, and closing off the conduit 71.

In the engine described, and similarly to the arrangement described in French Pat. No. 2 127 268, the cams 20, which in this case, have six crests between which are interposed six troughs, are made up to form two groups of three crests spaced substantially regularly angularly, and of three troughs corresponding thereto. It can thus be considered that the complete engine is constituted by the joining-up of two smaller engines 72 and 73 of respective cubic capacity C72 and C73, which of course correspond to the two aforesaid groups of cams, and which also correspond:

the engine 72, to the holes 51a, 53a, 55a, and, 51b, 53b, 55b; and, the engine 73, to the holes 52a, 54a, 56a, and, 52b, 54b, 56b.

The diagrammatical representation adopted in FIGS. 6 to 9 takes this particular fact into account and indicates that the main conduits 74a, 74b of the engine 72 and, the main conduits 75a, 75b of the engine 73 correspond to the aforementioned groups of three holes.

Figure 8:
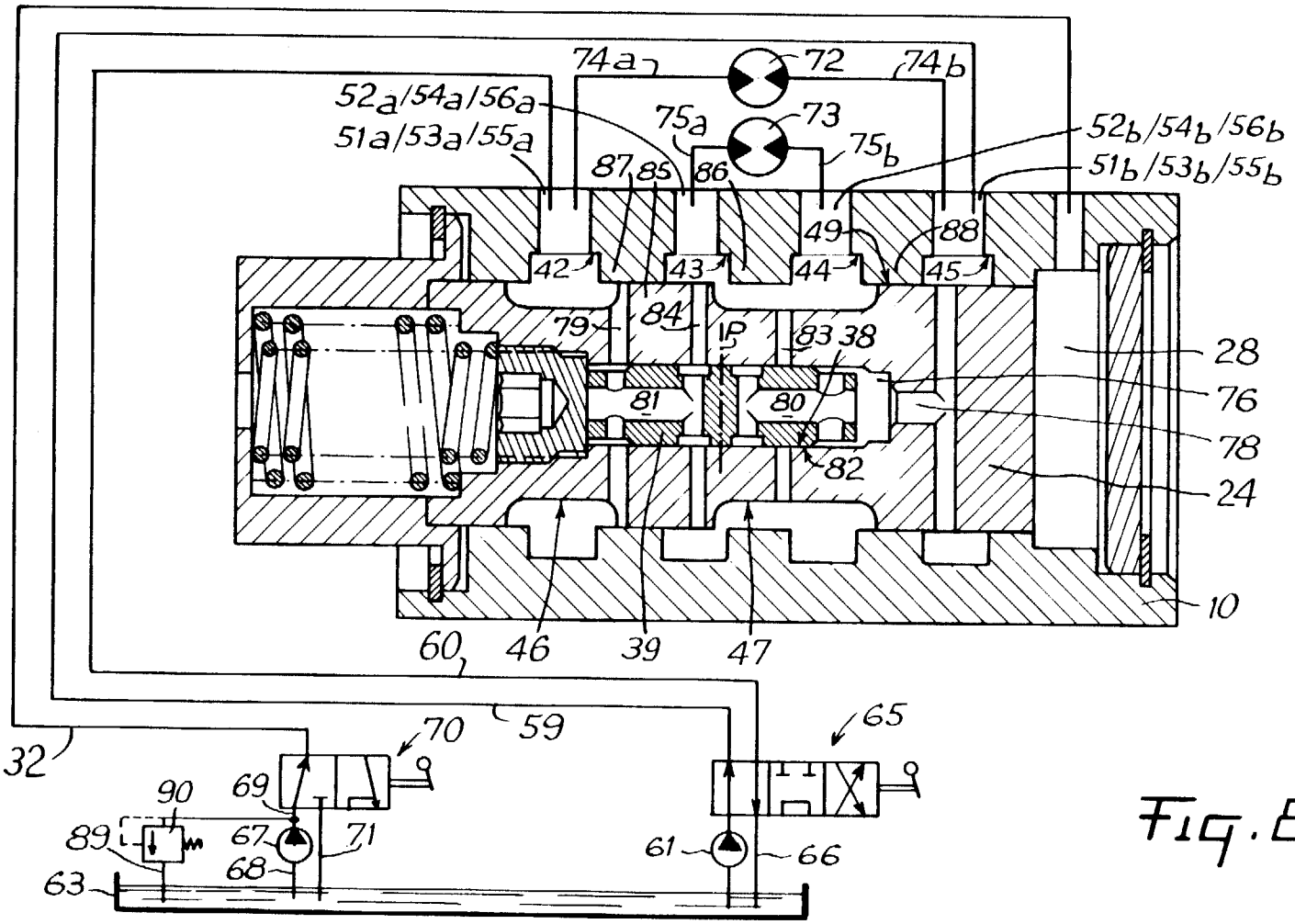
Figure 9:
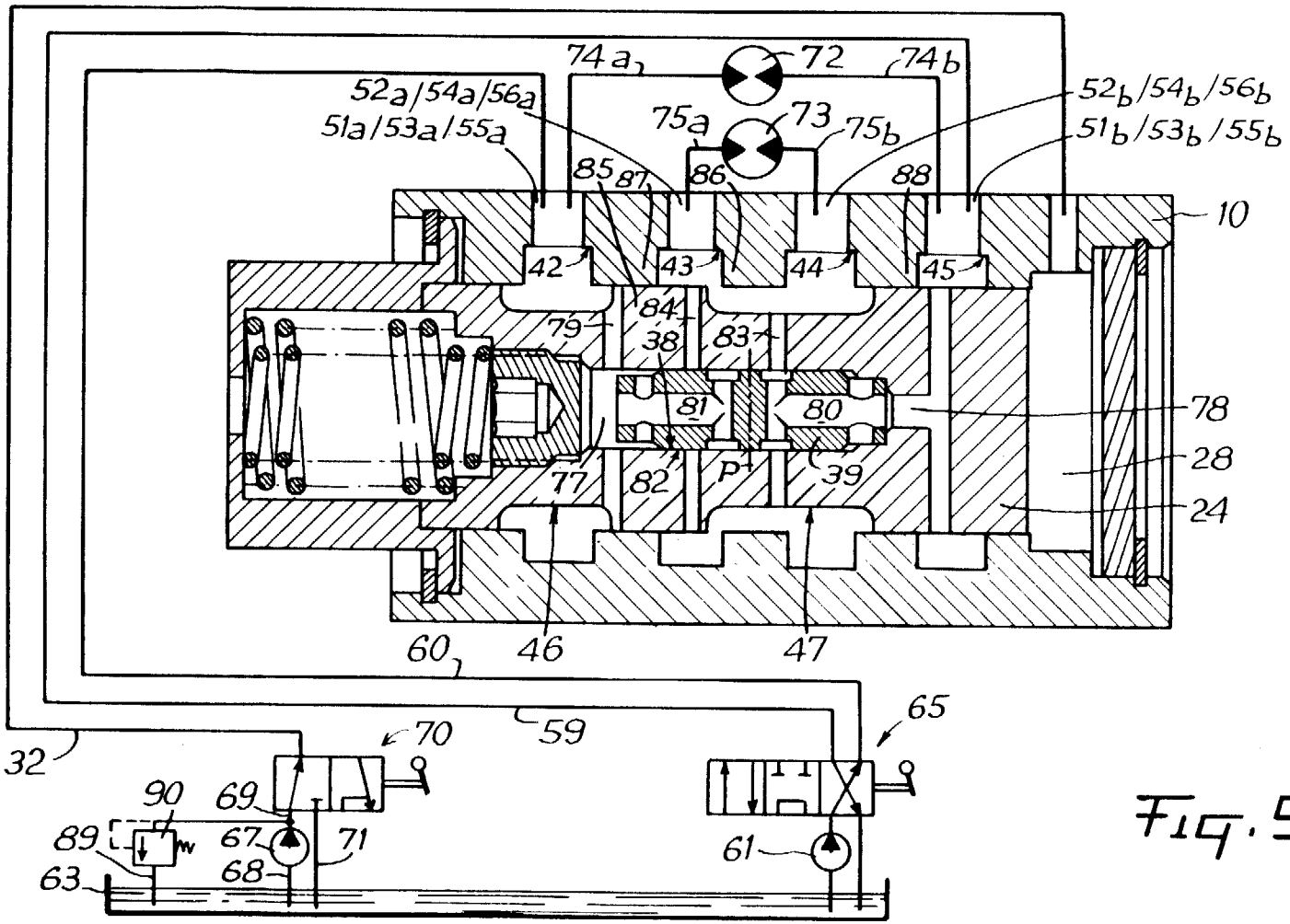

The description of the slide valve 24 of the shuttle valve 39 will be more particularly illustrated by the following points:

the ends of the shuttle valve 39 define with the bore 38 two end chambers 76, 77;

two conduits, so-called first diametric conduits 78, 79, provided in the selection valve, permanently connect, one 78, the groove 45 to one, 76, of the two end chambers, the other first conduit 79, connecting the groove 42 to the other, 77, of said two chambers; this in the configurations corresponding to the second position of the control valve 70 (FIGS. 8 and 9);

two other conduits, so-called second conduits 80, 81, provided in the shuttle valve 39, permanently connect, one 80, the chamber 76 to the cylindrical periphery 82 of the shuttle valve 39, the other 81, connecting the other chamber 77 to the cylindrical periphery 82;

two separate conduits, so-called third conduits 83, 84 provided in the selection valve 24, permanently connect the bore 38 to the cylindrical periphery 49 of the said selection valve.

It is also to be noted that the shuttle valve 39 is constituted by a part which is symmetrical with respect to its median transversal plane P, perpendicular to the axis 4 and at equal distance from the ends of the said shuttle valve.

The configurations corresponding to each of FIGS. 6 to 9 will now be defined.

The configuration of FIG. 6 is that wherein the control valves 65 and 70 are in their respective first position. The fluid contained in the chamber 28 is brought into communication with the reservoir 63 and therefore is not pressurized. As a result, the spring 36 is the only one to act on the selection valve 24, which it pushes completely towards the right. In this position of the selection valve 24, the wall 85 which separates the grooves 46 and 47 of said valve 24 is placed so as to face the wall 86 separating the grooves 43 and 44 of the valve bank 10, so that the said grooves 43 and 44 of the said bank 10 are isolated one from the other. In addition, opposite the wall 87 which separates the grooves 42 and 43 of the valve bank 10 is placed the groove 46 of the selection valve 24, thus creating a communication between the said grooves 42 and 43, and likewise, opposite the wall 88 which separates the grooves 44 and 45 of the valve bank 10, is placed the groove 47 of the selection valve 24, thus creating a communication between the said grooves 44 and 45 of the valve bank 10. The grooves 42 and 45 of the valve bank 10 are communicating, the groove 45 with the pressurized fluid delivered by the pump 61, and the groove 42 with the reservoir 63. It follows therefore that the various holes 51b, 52b, 53b, 54b, 55b and 56b, the two engines 72 and 73, are fed with pressurized fluid, the holes 51a, 52a, 53a, 54a, 55a and 56a communicating with the reservoir 63. The equivalent cubic capacity of the complete engine is, in the illustrated example, equal to the sum (C72+C73), the rotor 3 rotating in a first predetermined direction and at a first predetermined speed VI, so-called low speed, which is equal to the quotient of the flow rate Q by the equivalent cubic capacity: $VI=Q/(C72+C73)$.

Figure 7:
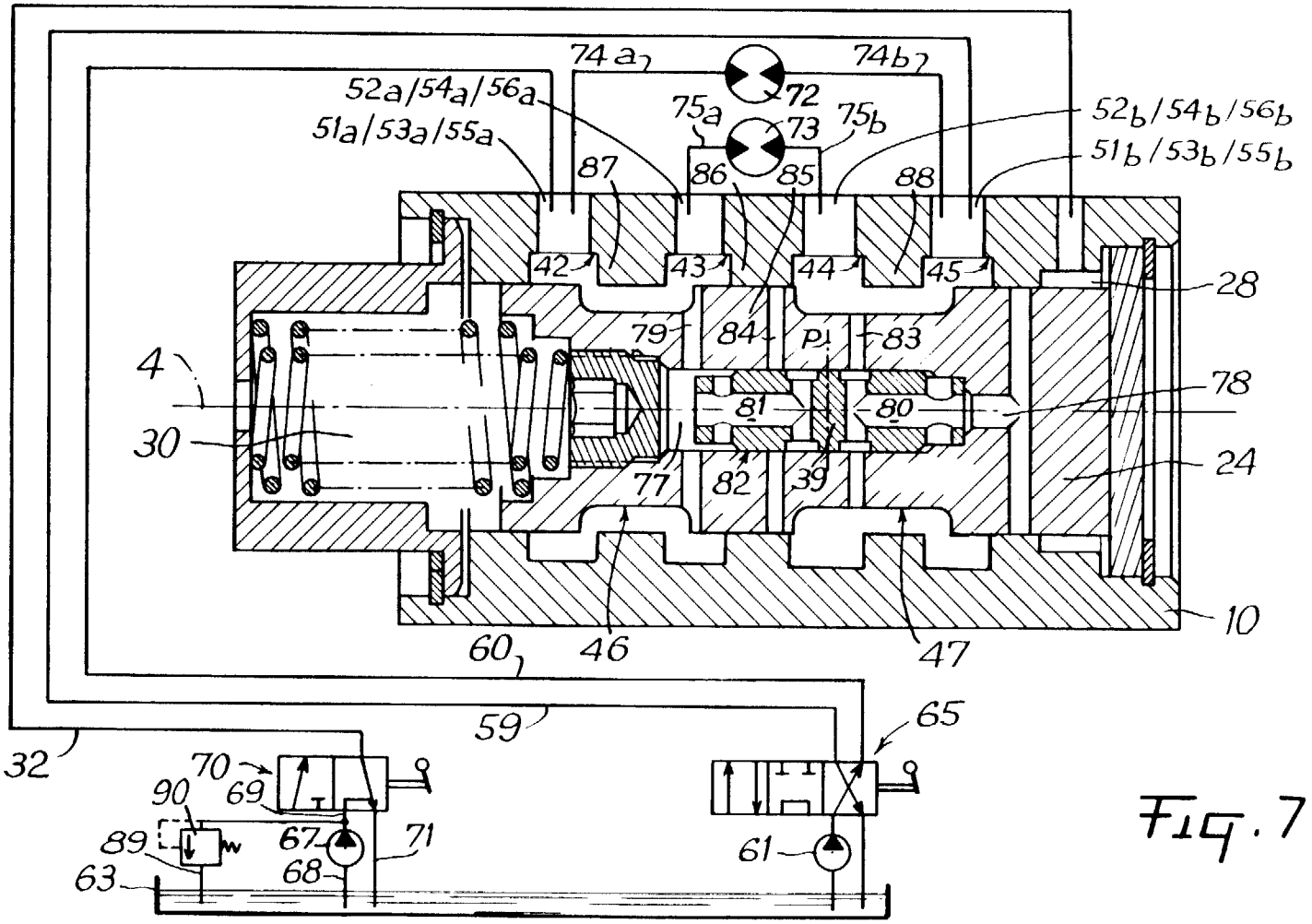

The configuration shown in FIG. 7 follows from that of FIG. 6 only by the displacement of the control valve 65 from its first to its third position. The only modification resulting therefrom is that the holes 51a, 52a, 53a, 54a, 55a and 56a are supplied with pressurized fluid delivered by the pump 61, and the holes 51b, 52b, 53b, 54b, 55b and 56b are correlatively communicating with the reservoir 63. The direction of rotation of the full engine is reversed, and the speed of rotation which is obtained is of course equal to: $-VI$.

In the two preceding configurations, the shuttle valve 39 has had no part to play; this will not be so in the configurations of FIGS. 8 and 9 which follow, and wherein the selection valve 24 has been pushed towards the left, in its other outermost position, following the displacement of the control valve 70 to its second position, and the correlative supply of pressurized fluid to the chamber 28. The new position of the selection valve 24 is such that:

its wall 85 and the end of its cylindrical peripheral face 49 are arranged to face, one, the wall 87, the other, the wall 88 of the valve bank 10, and isolate from one another, first the grooves 42 and 43 and second, the grooves 44 and 45 of the said bank 10;

its groove 47 is placed opposite the wall 86 of the valve bank 10 and creates a communication between the grooves 43 and 44 of the said bank 10.

In the configuration of FIG. 8, the control valve 65 is in its first position wherein the groove 45 is supplied with pressurized fluid from the pump 61, whereas the groove 42 communicates with the reservoir 63 (as in the configuration of FIG. 6). The first conduits 78 and 79 communicate with the grooves 45 and 42 respectively, the third conduits 83 and 84 both communicating with the communicating grooves 43 and 44. The high pressure of the fluid contained in the groove 45 has pushed the shuttle valve 39 towards the left, which pressure penetrates into the chamber 76, and pushes off towards the reservoir 63 the fluid contained in the other chamber (77) through the first conduit 79, the grooves 46 and 42, the conduit 60, the control valve 65 and the conduit 66. The second conduit 81 then communicates with the third conduit 84, the other second conduit 80 being closed off by the bore 38.

Thus, the same flow Q of pressurized fluid which feeds the complete engine is, this time, directed only towards the holes 51b, 53b and 55b, and thus towards the one engine 72 only, the holes 51a, 53a, 55a communicating with the reservoir 63. In addition, the two main conduits 75a and 75b of the engine 73 communicating one with the other, said engine is "short-circuited." From these observations, it follows:

on the one hand, that the equivalent cubic capacity of the complete engine is equal to the sole cubic capacity of the engine 72 and therefore that the complete engine turns at a second speed V2 equal to the quotient of the flow rate Q by the cubic capacity C72; $V2=Q/C72$, and in the same direction as in the configuration of FIG. 6, the said speed V2 being of course greater than V1 and being called high speed;

on the other hand, that the fluid supplying the cylinders of the engine 73 is the non-pressurized fluid contained in the groove 46, which reaches the grooves 43 and 44 via the first conduit 79, the second conduit 81 and the third conduit 84. Thus, the pistons of the engine 73 are moved first by being supplied with fluid, but also by being supplied with a non-pressurized or low-pressurized fluid.

The configuration of FIG. 9 corresponds, as already indicated, to the second position of the control valve 70, and also, to the third position of the control valve 65. The selection valve 24 is still in its second position and, with respect to the configuration of FIG. 8, only the shuttle valve 39 has been moved to its outermost position, towards the right, wherein the second conduit 80 issues into the third conduit 83, and wherein the other second conduit 81 is closed off by the bore 38. The displacement of the shuttle valve 39 is due to the pressurized fluid being pushed and admitted into the chamber 77.

Compared with the configuration of FIG. 8, it is noted that:

the engine 72 is still the only one to be supplied, the engine 73 being "short-circuited;"

the engine 72 is supplied by reversing the connection of the inlet of highly pressurized fluid with the return to the reservoir, and therefore turns in the reverse direction and at the "high speed" −V2;

the grooves 47, 43 and 44 communicate with the groove 45 which contains a non-pressurized fluid, so that, thereagain the pistons of the engine 73 are moved by being supplied with non-pressurized fluid.

The advantage of the arrangements described hereinabove resides precisely in the supply of non-pressurized fluid to the pistons of the "short-circuited" engine, this permitting, compared with prior engines, to considerably reduce the wear and damage caused to the pistons 19, the girders 21, the rollers 22 of the engine 73, and to any other elements of the complete engine, such as the cams 20 and the wheels 5 and 6 in particular. It should be noted that this result has been obtained with a reversible engine, whatever the direction of rotation selected.

The means for obtaining automatically this result are mainly constituted by the shuttle valve 39, which is a simple, inexpensive and especially reliable means. Moreover, the symmetry with respect to its transversal median plane P prevents any error of assembly when it is introduced in the bore 38.

The invention is not limited to the embodiment described hereinabove but on the contrary covers any variants that could be brought thereto without departing from the scope or the spirit thereof.

In particular, it is also applicable, on the one hand, to engines in which the two cubic capacities C72 and C73 are obtained, no longer by association of the cams, but by association of the cylinders, such as the engine described in French Pat. No. 1 411 047, on the other hand, to engines in which the two speeds are obtained, one with an equivalent cubic capacity equal to C72, or C73, the other with the cubic capacity (C72-C73), such as the engine described in French Pat. No. 2 127 268. Indeed, the essential part of the invention is to create a communication between the cylinders of the "short-circuited" engine with the lowest pressure, this being obviously applicable to the various types of engines mentioned hereinabove, and by adopting the aforementioned shuttle valve 39.

What is claimed is:

1. A pressurized fluid engine system comprising:

a rotary cylinder block mounted for rotation about an axis of rotation;

first and second groups of radial cylinders provided in said rotary cylinder block;

a piston mounted for movement in each of said cylinders to define a work chamber of variable volume;

a plurality of fluid passageways in said rotary cylinder block with each of said fluid passageways communicating on one end with the work chamber of one of said cylinders and having an open outer end in a transverse plane face of said cylinder block oriented perpendicularly to the axis of rotation of said cylinder block and with each open outer end being equidistantly spaced from each other and said axis of rotation;

a source of pressurized work fluid;

a sump;

a first fluid control valve;

a three-position fluid control valve;

first and second main supply conduits extending between said first fluid control valve and said second fluid control valve;

said three-position fluid control valve including selectively movable means movable to a first position for connecting said first main supply conduit to said source of pressurized work fluid and said second main supply conduit to said sump and to a second position for blocking the first and second main supply conduits and to a third position for connecting said first main supply conduit to said sump and said second main supply conduit to said source of pressurized work fluid; and wherein said first fluid control valve includes a valve housing, a piston valve mounted for axial positioning in a housing bore in said valve housing in a first position for directing pressurized work fluid to the fluid passageways in said rotary cylinder block to both groups of said cylinders to achieve low speed operation of said engine in a first direction when said three-position fluid control valve is in its first position or in a reverse direction when said three-position fluid control valve is in its third position and a second position for directing pressurized work fluid to only a selected one of said groups of cylinders to achieve high speed operation of said engine when said three-position fluid control valve is in its first position or in a reverse direction when said three-position fluid control valve is in its third position while simultaneously providing substantially unpressurized work fluid to the cylinders of the non-selected group of cylinders.

2. A pressurized fluid engine system as recited in claim 1 wherein said first fluid control valve includes:

a fixedly positioned valve seat fixedly connected to said valve housing and having a transverse planar surface facing and sealingly contacting said transverse planar surface of said rotary cylinder block and including a plurality of flow holes oriented equidistantly about said axis of rotation at the same radial distance therefrom as the radial distance of the open outer ends of said fluid passageways in said rotary cylinder block so that the open outer ends of said passageways in said rotary cylinder block are sequentially moved into alignment with the flow holes in the valve seat to permit fluid flow therebetween as a consequence of rotation of the cylinder block;

a plurality of annular bore grooves provided at different locations along the length of said bore in said valve housing; and conduit means connecting each of said annular bore grooves to selected ones of said flow holes.

3. A pressurized fluid engine system as recited in claim 2 wherein said valve housing includes:

compression spring means in one end of said valve housing for urging said piston valve toward its first position; and said piston valve includes:

a plurality of annular spool grooves in its outer surface;

a closed end axial bore;

a pair of diametric conduits respectively having opposite ends in communication with opposite sides of a respective one of said annular spool grooves;

a third diametric conduit extending between opposite sides of the outer surface of said piston valve at a location between said annular spool grooves;

a fourth diametric conduit adjacent the end of said piston valve spaced from said compression spring and having an axial extension communicating with said closed end axial bore;

a shuttle valve mounted in said closed end axial bore for movement between first and second positions at opposite ends of the closed end axial bore, said shuttle valve including:

first and second axial shuttle bores extending inwardly from opposite ends of said shuttle valve and terminating at a central divider wall;

annular shuttle grooves provided adjacent said central divider wall on opposite sides thereof in the outer surface of said shuttle valve;

the outer ends fo said shuttle valve comprising reduced diameter portions which communicate with said shuttle bores by means of radial bores adjacent the ends of the shuttle valve; and inner radial bores communicating said annular shuttle grooves with the inner ends of said axial shuttle bores.

4. A pressurized fluid engine system as recited in claim 3 additionally including selectively operable control means including a second source of pressurized fluid for positioning said shuttle valve in either one of its two positions.

5. A pressurized fluid engine system as recited in claim 4 wherein said selectively operable control means additionally includes:

a control conduit extending from said second source of pressurized fluid to a pressurized fluid admission chamber adjacent one end of said bore in said valve housing; and two position control valve means in said control conduit operable when in a first position for connecting said fluid admission chamber to sump and operable when in a second position for connecting said second source of pressurized fluid to said fluid admission chamber so as to provide fluid pressure force on said piston valve to move said piston valve against the force of said compression spring to the second position of said piston valve and to also provide fluid pressure through said fourth diametric conduit to effect movement of said shuttle valve to its second position in which said shuttle valve provides communication of the sump with all non-selected cylinders.

6. A pressurized fluid engine system as recited in claim 5 wherein:

said plurality of annular bore grooves comprise first, second, third, and fourth annular grooves respectively positioned along the length of said bore from the end of said bore in which said compression spring is positioned; and further including main conduit means connecting said first annular bore groove to the fluid passageways of said selected group of cylinders; and further including additional main conduit means connecting said second annular bore groove and said third annular bore groove to the fluid passageways of said other group of cylinders; and wherein said annular spool grooves comprise a first annular spool groove adjacent the end of said piston valve engaged with said compression spring and communicating with said first and second annular bore grooves and a second annular spool groove communicating said third and fourth annular bore grooves when said piston valve is in its first position but wherein said first annular valve groove communicates only with said first annular bore groove and said second annular valve groove communicates with said second and third annular bore grooves and said fourth diametric conduit communicates with said fourth annular bore groove when said piston valve is in its second position; and wherein said shuttle valve, when in its second position, provides communication between said third and fourth annular bore grooves when said piston valve is in its second position.

7. A pressurized fluid engine as recited in claim 6 wherein said shuttle valve is symmetrical about a plane passing through said divider wall.

*8. A pressurized fluid engine system comprising:*

*first and second groups of cylinders;*

*a piston mounted for movement in each of said cylinders to define a work chamber of variable volume;*

*a plurality of fluid passageways with each of said fluid passageways communicating on one end with the work chamber of one of said cylinders and having an opposite end;*

*a source of pressurized work fluid;* a sump;

a first fluid control valve means communicating with said opposite ends of said fluid passageways and comprising two enclosures;

*a three-position fluid control valve;*

*a first and second main supply conduits extending between said two enclosures of said first fluid control valve and said three position fluid control valve;*

*said three-position fluid control valve including selectively movable means movable to a first position for connecting said first main supply conduit to said source of pressurized work fluid and said second main supply conduit to said sump and to a second position for blocking the first and second main supply conduits and to a third position for connecting said first main supply conduit to said sump and said second main supply conduit to said source of pressurized work fluid;*

*said first fluid control valve means including means for selecting the speed of rotation of the engine comprising a housing, a valve member mounted for axial positioning in a housing bore in said housing in a first position for directing pressurized work fluid to the fluid passageways to both groups of said cylinders to achieve low speed operation of said engine and a second position for directing pressurized work fluid to only a selected one of said groups of cylinders to achieve high speed operation of said engine while simultaneously providing substantially unpressurized work fluid to the cylinders of the non-selected group of cylinders;*

*an auxiliary device for supplying the cylinders of the second group of cylinders comprising fluid passages which are automatically placed in communication, when the valve member of the selecting means is placed in its second position, on the one hand with that of the two enclosures which contains the fluid under the lowest pressure, and on the other hand with the cylinders of the second group of cylinders characterized in that said supply auxiliary device is constituted by a shuttle valve comprising a body, a connecting element mounted inside the body, two fluid jacks with antagonistic effects, connected to said connecting element and fluid passages adapted, at least when the valve member of the selecting means is placed in the second position, to create a communication between one or the other of the enclosures and the cylinders of the second group of cylinders, the said connecting element being:*

*movably mounted inside the body of the auxiliary device and being adapted to occupy at least a first and a second particular positions wherein the said passages place in communication one or the other of the enclosures with the cylinders of the second group of cylinders;*

*subjected to the antagonistic effect of the said jacks, which are connected to the said enclosures, at least when the valve member of the selecting means is placed in its second position; and*

*placed, depending on the direction of the resultant of said antagonistic forces, in one or the other of said particular first and second positions, thus creating a communication between the cylinders of the second group of cylinders and the said enclosure containing the fluid under the lowest pressure.*

* * * * *